United States Patent [19]

Balding

[11] 4,340,905
[45] Jul. 20, 1982

[54] PHOTOGRAPHIC PRINTER AND COLOR FILM ANALYZER APPARATUS

[76] Inventor: George H. Balding, 1476 Tameron Dr., Sandy, Utah 84070

[21] Appl. No.: 186,486

[22] Filed: Sep. 12, 1980

[51] Int. Cl.³ .............................................. H04N 1/46
[52] U.S. Cl. ................................................ 358/80
[58] Field of Search ........................................ 358/80

[56] References Cited

U.S. PATENT DOCUMENTS 4,204,223  5/1980  Gast et al. ............................. 358/80

Primary Examiner—Richard Murray
Attorney, Agent, or Firm—K. S. Cornaby

[57] ABSTRACT

An improved color photographic printing apparatus which has a video analyzer for viewing a film negative before printing, and has circuitry for controlling the color and density of the image and for controlling the printing times of a photographic printer through a mirror computer to produce a photographic print which is the same as the image seen on the video analyzer.

10 Claims, 5 Drawing Figures

PHOTOGRAPHIC PRINTER AND COLOR FILM ANALYZER APPARATUS

BACKGROUND OF THE INVENTION

In the field of photographic printers for color film, recent developments have provided automated printing mechanisms that are controlled with respect to density and color corrections by micro computers to compensate for under- and overexposure of the film negative. The micro computer or processor must have the compensation data fed into it either by hand or from another source, such as a paper tape or the like, before it can regulate the operation of the filter paddles and shutter of the printer. This process requires an educated guess on the part of the operator, and typically necessitates 2-4 or more tries before the correct print is obtained.

Various devices have been developed for previewing the film negatives with a TV camera to permit the image from the negative to be viewed in the proper colors. An example of this latest development in such devices is my U.S. Pat. No. 4,097,892, entitled Video Color Film Analyzer, in which the operator is able to adjust controls which compensate for under- or overexposed negatives and poor color in the film negative to produce the best possible image on a TV screen. The compensating density and color data are taken from the analyzer and stored usually on paper tape either, as micro processor for use in printing the color print.

Typical U.S. patents relating to the various phases of the process are U.S. Pat. Nos. 4,140,391; 4,149,799; 4,154,523; and 4,168,120. Now of these patents disclose devices for handling a portion of the total process, but none has proposed an apparatus to accomplish all phases of the process with one apparatus.

It is therefore an objective of this invention to provide an apparatus that will preview color film negatives in positive color, permit compensation of poor density and color variations, and feed such compensating factors directly to a photographic printing mechanism for use in printing a color positive print of the same image as viewed on the preview TV screen.

It is also an objective of this invention to eliminate the necessity of reprinting photos several times to achieve accurate results in compensating for poor film exposure, thereby eliminating inefficient and costly use of photographic paper, chemicals and labor.

BRIEF SUMMARY OF THE INVENTION

An apparatus according to the invention has the following components in combination: film analyzing means for viewing the image from a color film negative on a TV screen in positive color; compensating control means for changing the color and density composition of the image on the screen to produce an acceptable color reproduction of the image on the TV screen; conversion means for converting the color and density compensating factors to digital values; means for feeding the color and density digital values directly into micro computer means; micro computer means for accepting the digital values and using those values to control the operation of light density and color filter means of a photographic printing mechanism; and a photographic printing means having shutter and color filter means to control the density and color combinations for reproducing a color image on photographic film.

THE DRAWINGS

Preferred embodiments of the invention are illustrated in the accompanying drawings, in which:

FIG. 1 is a front elevation of the apparatus of the invention showing a preferred arrangement of the component elements in a housing;

FIG. 2, a side elevational view of the apparatus taken along line 2—2 of FIG. 1;

FIG. 3, a block diagram of the timer section of the apparatus;

FIG. 4, a block diagram of the printer section of the apparatus; and

FIG. 5, a block diagram showing the relationship of the micro processor, analog to digital converter, video computer and numeric generator in a preferred embodiment of the apparatus.

DETAILED DESCRIPTION OF THE ILLUSTRATED EMBODIMENTS

Figure 2:
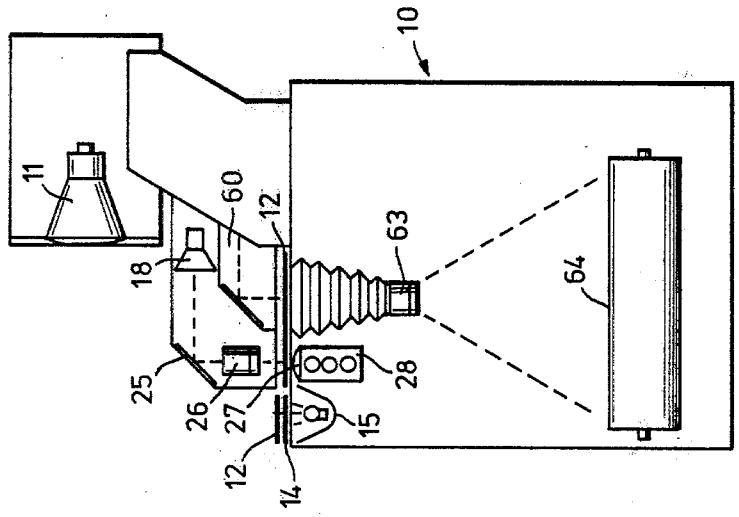
Figure 1:
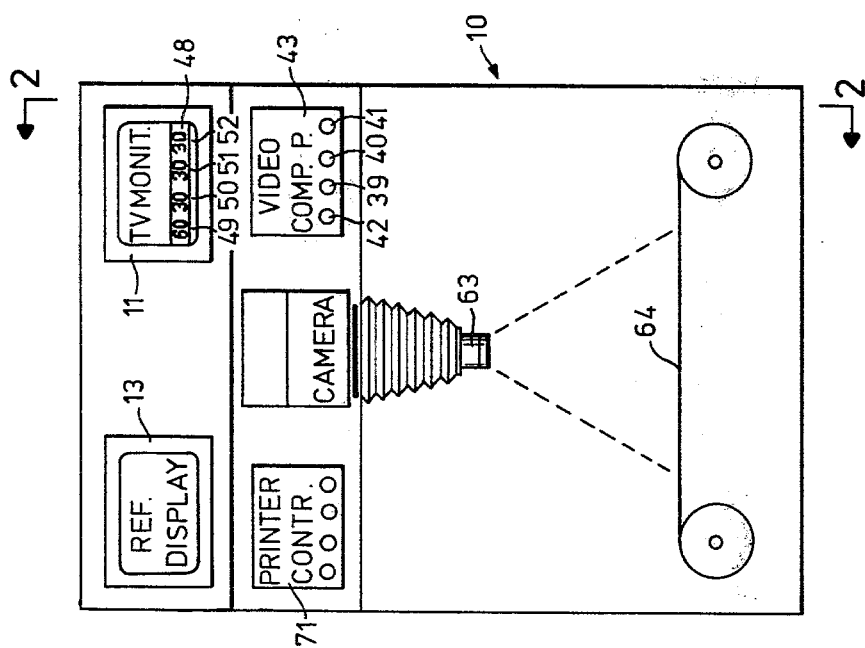

As shown in FIGS. 1 and 2, a preferred embodiment of an apparatus of the present invention has a housing 10 for containing the components of the apparatus. Housing 10 has a standard R-G-B television monitor 11 having a self-contained power supply for all low voltages used by the monitor. Monitor 11 also has a Sync separator to separate vertical and horizontal pulses for the purpose of synchronizing vertical and horizontal sweeps. The purpose of monitor 11 is to provide a means for displaying a color reproduction of a color negative film 12 and compare it with the image reproduced on a rear projection display screen 13 of a reference slide preferably having similar subject matter for comparison of colors, density and exposure characteristics by the operator.

The apparatus is adapted to be operated by one person seated before the consol of housing 10. The various components and their functions can best be described by reference to FIGS. 3-5 taken generally in sequence of their use.

A color film negative 12 to be printed as a positive color print is placed in a film preview receptacle 14 which is illuminated from the underside by a light source 15. At this point film negative 12 can be correctly positioned with respect to vertical and horizontal location, and then locked into position by appropriate securing means (not shown) in receptacle 14.

Film negative 12 is then moved by the operator to the second position 16 under the scanning portion of the apparatus. The scanning portion is best represented by the video color film analyzer described in my U.S. Pat. No. 4,097,892. In such an analyzer, a power supply 17 is operated from a 110 V. AC source and provides the necessary voltages to operate the analyzer. A flying spot scanner system is used to generate red, green and blue video signals utilizing a flying spot cathode ray tube 18 having deflection voltages from deflection yoke 19. The deflection voltages are provided by vertical sweeps 20 and horizontal sweep 21 circuits, which are controlled by a timer circuit 22. A high voltage power supply 23 driven by horizontal sweep circuit 21 is also connected to the anode of tube 18. A photo cell 24 is positioned in front of tube 18 to control the flying spot brightners to a constant value.

The flying spot of tube 18 is focused on film negative 12 through a 45° mirror 25 by a lens 26. Lens 26 can be changed to cover a larger or smaller area of negative 12 as desired. After passing through negative 12, the flying spot of light is collinated with a second lens 27 and then travels into a light-tight box 28. Box 28 contains a combination of dichroic mirrors and a front surface mirror (not shown here, but more particularly described in U.S. Pat. No. 4,097,892) and three photomultiplier tubes for red 29, blue 30, and green 31. Light box 28 is employed to separate the three basic colors of light from the light column emanating from film negative 12 by reflecting the different light colors into respective photomultiplier tubes 29,30,31, which convert the red, blue and green light to electrical signals having amplitudes related to the amount of red, blue and green light passing into them.

Figure 4:
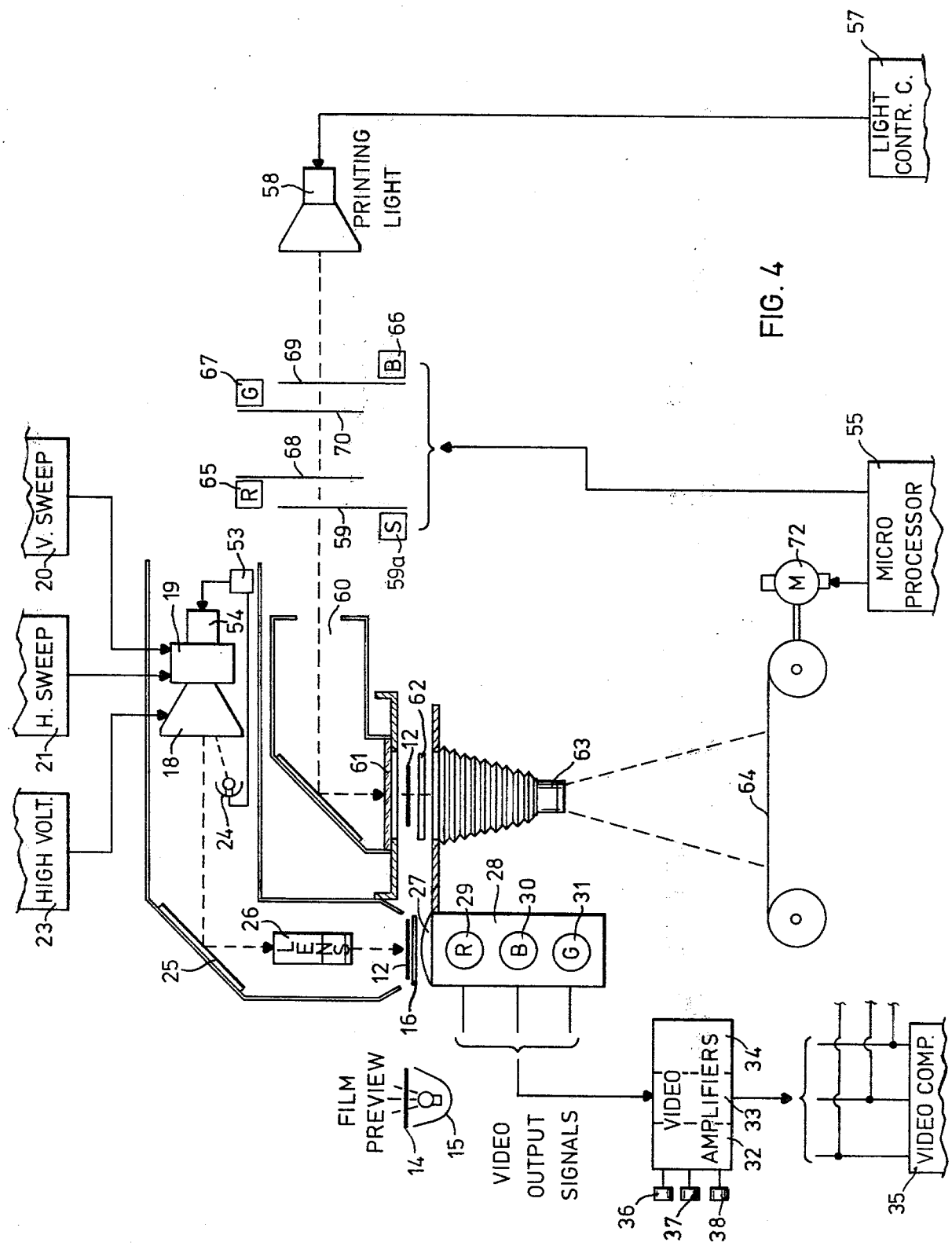

The red, blue and green video signals provided at the outputs of photomultipliers 29, 30, and 31 are transmitted to video signal amplifiers 32, 33, and 34 and from there to the circuit inputs of a video computer, 35, is shown in FIG. 4. The gains of video amplifiers 32, 33, and 34 are adjustable to compensate for various types of film negatives 12 using potentiometers 36, 37, and 38. Video computer 35 is employed as described in U.S. Pat. No. 4,097,892 to adjust the amplitude of the red, blue, and green video signals and density of the picture as seen on monitor 11 using controls 39, 40, 41, and 42, respectively, which for ease of operation are located preferably on the video computer control panel 43. The operator adjusts the density and red, blue and green colors as desired using the reproduction of the 35 mm slide on the reference display 13 as a color and density guide. The 35 mm reference slide is projected onto the rear projection screen of display 13 from a slide projector 44 mounted in housing 10 behind display 13.

Video computer 35 performs two essential functions in this apparatus. First it provides modified video signals corresponding to density, red, blue and green colors to monitor 11 for visual display; and secondly it provides varying DC control voltages relating to the density and red, blue and green colors derived from the settings of potentiometer 39, 40, 41, and 42. These control voltages are introduced into the input of an analog to digital converter 45 and are converted to serial digital signals. Those signals are in turn transmitted to a numeric generator 46, which generates four numeric video signals for mixing at point 47 with the four modified video signals from video computer 35. The mixed signals are then transmitted to monitor 11 and displayed over a blanked strip 48 as digital signals representing density, red, blue and green colors, 49, 50, 51, and 52.

Figure 3:
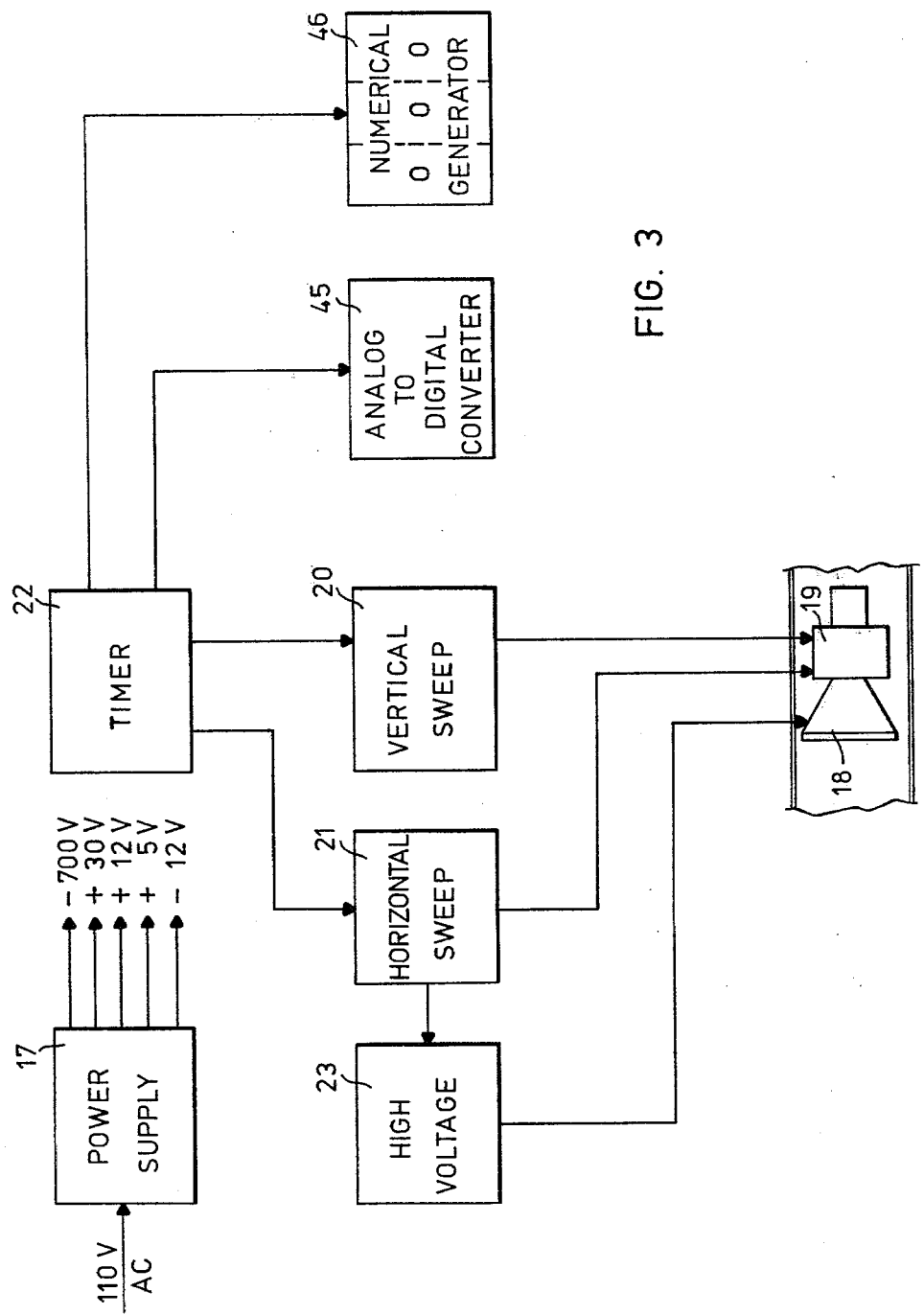
Figure 5:
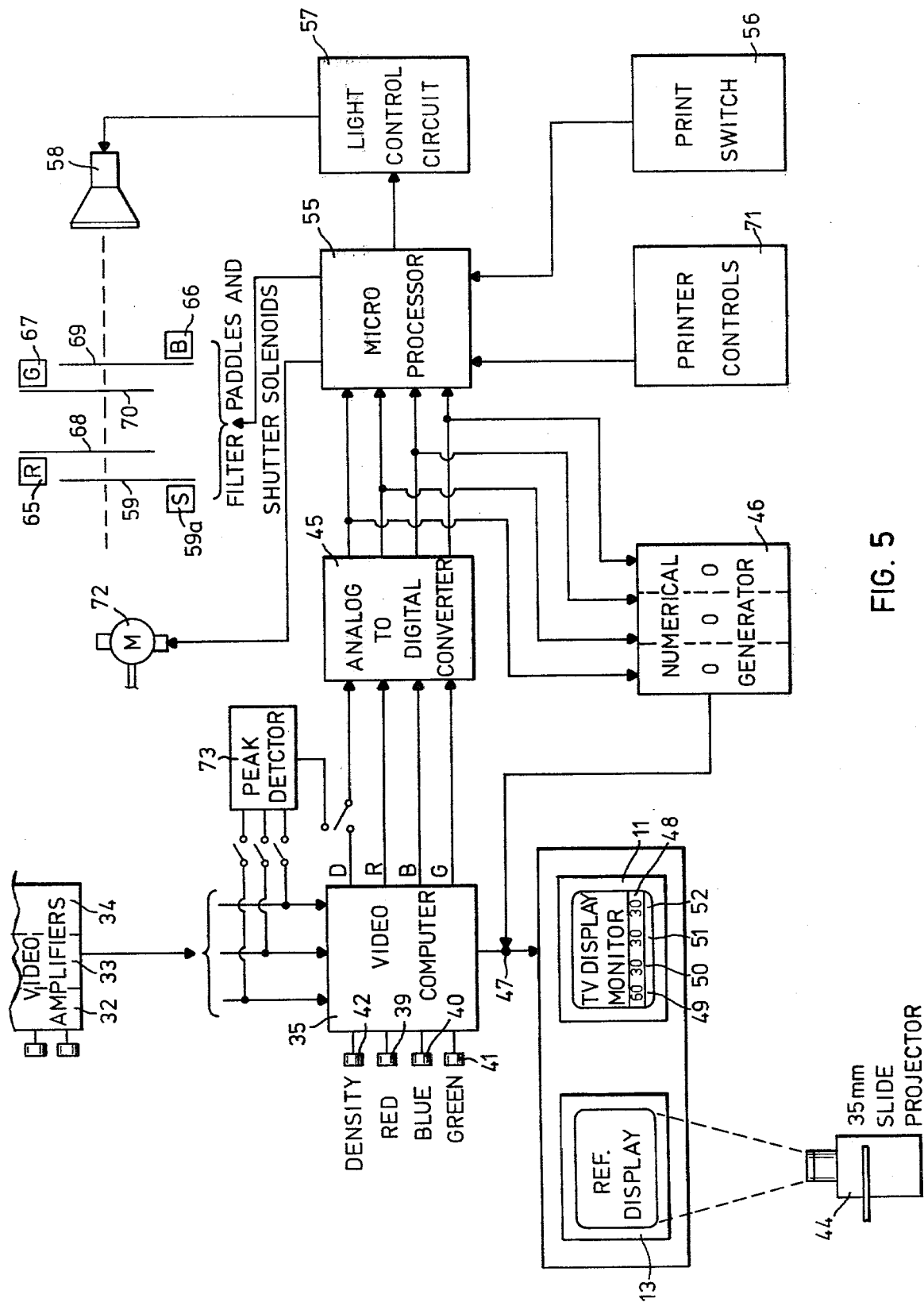

Numeric generator 46 shown in FIG. 5 contains all of the circuits necessary for generating the complete set of numerics on the blanked strip 48 of monitor 11, as set out more completely in U.S. Pat. No. 4,097,892. The density and color circuits within numeric generator 46 operate by receiving serial pulses from the analog to digital converter 45, which enter a counter chip for conversion to BCD code. The BCD code signals are further amplified to 12 v. and inverted in polarity by an inverter. In order to position the readout numbers 49, 50, 51 and 52 on blanked strip 48, a pulse is produced in timer 22, as shown in FIG. 3, which is generated near the end of the sweep generated by vertical sweep circuit 20. This pulse is sent to each of the separate number generator chips (not shown) in generator 46, causing all numerics to be positioned in a straight line across the screen. To position the numerics horizontally on monitor 11, potentiometers are used to provide an RC time constant.

Timer circuit 22, as shown in FIG. 3, provides the timing pulses for synchronizing the raster on monitor 11 and the vertical sweep 20 and horizontal sweep 21 in the video color film analyzer. Among others, timer circuit 22 also produces composite sync signals for synchronizing the monitor 11 and composite blanking for blanking cathode ray tube 18. A 3.58 MH clock signal is also generated in timer circuit 22 for use in the analog to Digital Converter 45. The timing circuit in this embodiment has a crystal controlled oscillator for counting down to the frequencies required to drive a sync generator chip (not shown). The sync generator chip provides composite sync, composite blanking, vertical sync and horizontal sync for use in the rest of the apparatus.

As illustrated in FIG. 4, in this embodiment the light output of the cathode ray tube 18 is held constant with an automatic feedback system comprising photo cell 24 coupled to a DC amplifier 53, which is in turn connected with and the control grid 54 of tube 18. In operation, as photo cell 24 collects light from tube 18, it begins to conduct when more light is available. This causes a voltage change which is amplified by amplifier 53. The amplified signal from amplifier 53 causes the control grid 54 of tube 18 to go more negative when more light is detected and more positive when less light is detected by photo cell 24, thereby holding the light output of tube 18 constant.

Once the desired adjusted values for density and red, blue and green colors for negative 12 have been established by the operator and are reflected in the digital readouts 49, 50, 51, and 52 on monitor 11, the four digital values fed from video computer 35 to analog to digital computer 45 are ready to be transmitted to a micro processor 55. The same four output signals from converter 45, which are used to drive the numeric generator 46, are fed into the input of micro processor 55, wherein the four signals are converted to time increments. Micro processor 55 is used to control the photo printing function of the apparatus of the invention and is actuated by print switch 56 through the operator. The actuation of print switch 56 causes micro processor 55 to actuate a light control circuit 57 to turn on printing light 58 and also to open a dark shutter 58 by actuating solenoid 59a, permitting light to pass into a mirror box 60, through diffusion material 61 to film negative 12, which has by now been moved by the operator from its position in the scanner to a holder 62 above lens 63 in the printer section. The light passes from film 12 through lens 63 to focus the film image onto printing paper 64, all as shown in FIG. 4.

Micro processor 55 computes the individual times for which each color component is to be operative from the reference values obtained from the analog to digital converter 45, and then energize solenoids 65, 66, and 67 to rotate termination filter paddles 68, 69, and 70 representing red, blue and green into the light path to stop the respective colors from continuing to travel the light path through film 12 to print paper 64. The operator can also feed control data from keyboard 71 on the control panel of housing 10, shown in FIG. 1 and in FIG. 5, to calibrate the times required for the utilization of reference values from converter 45 and to vary the interaction effects of the filter paddles 68, 69, and 70. After each of the filter paddles 68, 69 and 70 have closed and the dark shutter 59 has entered the light path, a paper advance motor 72 is energized by micro processor 55 to advance printer paper 64 a measured distance for the next photo and then stop it.

Micro processor 55 is a conventional micro computer, and is programmable to provide the functions set forth herein and is flexible in computing desired times for operation of the color paddles in response to data fed from a keyboard operated by the operator.

Referring now to FIG. 5, the digital signals generated in analog to digital converter 45, not only reflect the DC voltages derived from the video computer control potentiometer 39, 40, 41, and 42, but can also indicate voltage amplitudes from a peak amplitude detector 73. Peak detector 73 is used to set up the gain controls 36, 37, and 38 on video amplifiers 32, 33, and 34 of FIG. 4, by adjusting the controls to a pre-selected level as indicated in the digital values shown on blanked strip 48 of monitor 11. The same peak detector 73 can also be utilized to set up photomultiplier controls 39, 40, 41, and 42 by setting them to pre-selected values shown in the digital values 49, 50, 51, and 52 on monitor 11.

While this invention has been described and illustrated herein with respect to preferred embodiments, it is understood that alternative embodiments and substantial equivalents are included within the scope of the invention as defined by appended claims.

I claim:

1. Apparatus for analyzing and printing color and density corrected photographic prints from color film, comprising in combination:

video color film analyzer means for reviewing a positive image on a cathode ray tube taken from a color film, said analyzer having means for adjusting the color and density values of the image on the tube; and photographic printing means having means for receiving said adjusted color and density values from said video color film analyzer means and simultaneously converting said color and density values into corresponding timed increments for directly controlling the exposure of the color film for immediate use in printing a color and density corrected photograph.

2. An apparatus as set forth in claim 1, wherein said apparatus has control means for controlling both the color and density of the image shown on said cathode ray tube and for controlling the timed increments in said micro processor means.

3. An apparatus as set forth in claim 1, wherein said apparatus has control means for adjusting parameters for different types of films used in said apparatus.

4. An apparatus as set forth in claim 1, wherein said apparatus includes peak detector means for detecting peak amplitudes in said video analyzer means.

5. An apparatus as set forth in claim 1, wherein said apparatus includes means for comparing a projected image of a reference film slide with the image projected on said cathode ray tube.

6. An apparatus as set forth in claim 1, wherein said apparatus includes display means for displaying the digital color and density values on said cathode ray tube.

7. An apparatus as set forth in claim 1, wherein said apparatus has a three stage film negative holding means including a first stage for previewing the negative for proper positioning in the holder; a second stage for analyzing the negative in said film analyzer means; and a third stage for printing a color and density image of the negative.

8. An apparatus as set forth in claim 1, wherein said means in said photographic printing means for receiving said adjusted color and density values from said video color film analyzer means and simultaneously converting said values into corresponding timed increments comprises micro processor means.

9. A method of analyzing a film negative and printing a color and density corrected photographic reproduction of the image on the film negative, comprising the steps of analyzing a film negative with a video film analyzer to project a positive color image of the negative on a cathode ray tube;

adjusting the color and density of the projected image to correct deficiencies in color and density;

converting the adjusted color and density values to digital values;

introducing said digital values directly into a micro processor;

converting said digital values into timed increments; and applying said time increments to actuate shutter means, printing light and color filter means in a photographic printing means to produce a color and density corrected photograph.

10. A method as set forth in claim 9, including the step of comparing said cathode ray tube projected image with a projected image of a reference color slide to determine desired color balance.

* * * * *